Figure 1:
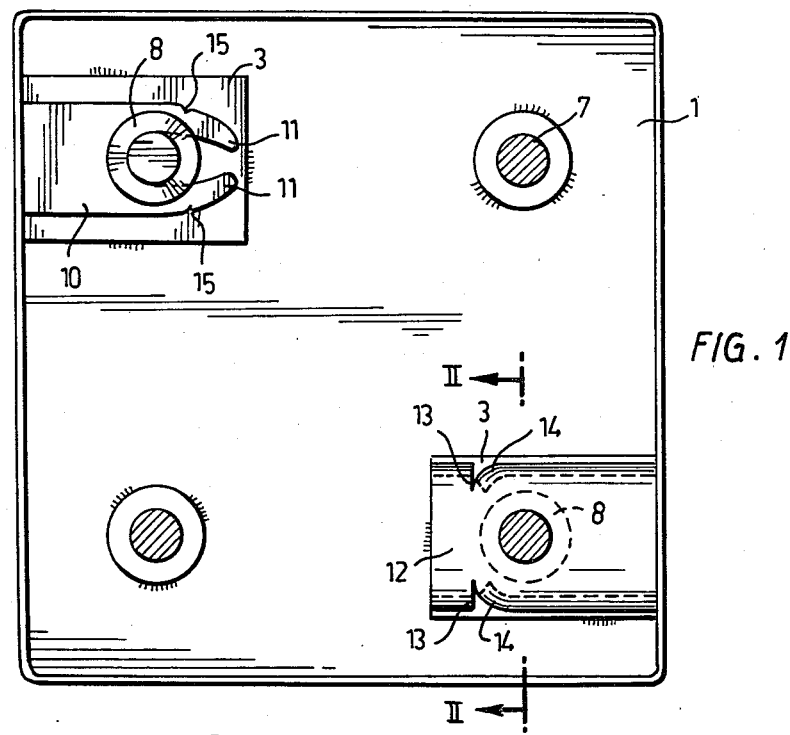

United States Patent [19]

Kaimo

[11] 4,362,416

[45] Dec. 7, 1982

[54] EXTENSION JOINT FOR CONCRETE POLES

[75] Inventor: Matti Kaimo, Virkkala, Finland

[73] Assignee: Oy Lohja AB, Nummela, Finland

[21] Appl. No.: 226,738

[22] Filed: Jan. 21, 1981

[30] Foreign Application Priority Data

Jan. 28, 1980 [FI] Finland .................................. 800237

[51] Int. Cl.³ .............................................. E02D 5/52
[52] U.S. Cl. ..................................... 403/316; 403/338; 403/374; 405/252
[58] Field of Search ............... 403/374, 379, 338, 324, 403/409, 261, 316; 405/251, 252

[56] References Cited

U.S. PATENT DOCUMENTS 2,013,962 9/1935 Hutchens ............................ 403/379
3,384,393 5/1968 Horton et al. .................. 403/261 X
3,884,589 5/1975 Liedholm ............................ 403/316

*Primary Examiner*—Andrew V. Kundrat

[57] ABSTRACT

The invention relates to an extension joint for concrete poles of the type in which at least one pin in a first pole penetrates into a recess in a second pole. The end of the pin is provided with a shoulder and is locked in the second pole by means of a wedge having shanks each engaging one side of the pin. The wedge is locked in its driven-in position while being driven in by the bending of the shanks towards each other after they have passed the pin. The wedge and the free end of the pin are covered by a channel member or furrow, whose side walls have portions bent inwards and guiding the shanks when the wedge is being driven in.

4 Claims, 3 Drawing Figures

U.S. Patent

Dec. 7, 1982

4,362,416

EXTENSION JOINT FOR CONCRETE POLES

This invention relates to an extension joint for concrete poles in which the joint ends of the poles are provided with a bottom plate to which are fastened jointing means comprising a pin projecting from the bottom plate of a first pole, an opening in the bottom plate of a second pole, and a stop face which is located around the opening on the inside of the bottom plate and through which said pin can extend, and a wedge which is transverse to the pin and provided with shanks each engaging the pin on one side and which can be wedged in between a shoulder at the end of the pin and the stop face for locking the pin of the first pole to the second pole with prestressing. On the path of movement of the wedge shanks, when they are being driven into their positions, there are guide means fastened to the stop face, by the effect of which guide means the shanks are turned towards each other having passed by the pin, thereby locking the wedge in the locking position. Moreover, the wedge and the free end of the pin are covered by a channel member or furrow parallel to the wedge, the longitudinal edges of the furrow being fastened to the stop face.

A construction of this type are described in the Finnish Patent Publication No. 54,633. Therein the anchoring steels are fastened to the outside face of the furrows parallel to the wedge, whereby an almost direct transfer of forces from pole to pole is achieved. Moreover, these furrows protect the wedges and the stop faces from concrete, which might make the installation of the joint more difficult.

The object of the present invention is as simply as possible to provide guide means for the wedge shanks in an extension joint of concrete poles in which the above furrow is used. This object has been achieved by means of the present invention, which is characterized in that the guide means for the wedge shanks consist of wall portions bent diagonally inwards at transverse cuts in the side walls of the furrow. In this way the extension joint can be in a simply way provided with guide means for the wedge shanks despite the use of a furrow.

An embodiment of the invention is characterized in that, as viewed in the driving-in direction of the wedge, the wall portion placed in front of the cuts is bent inwards. A wall portion bent in this way has a particularly advantageous curved guide face for the shanks of the wedge, and the edge between the inside face of the wall and the cut face then functions as a projection that penetrates into the recesses placed in the outer side of the shanks of the wedge when the wedge is in the fully driven-in position.

Figure 2:
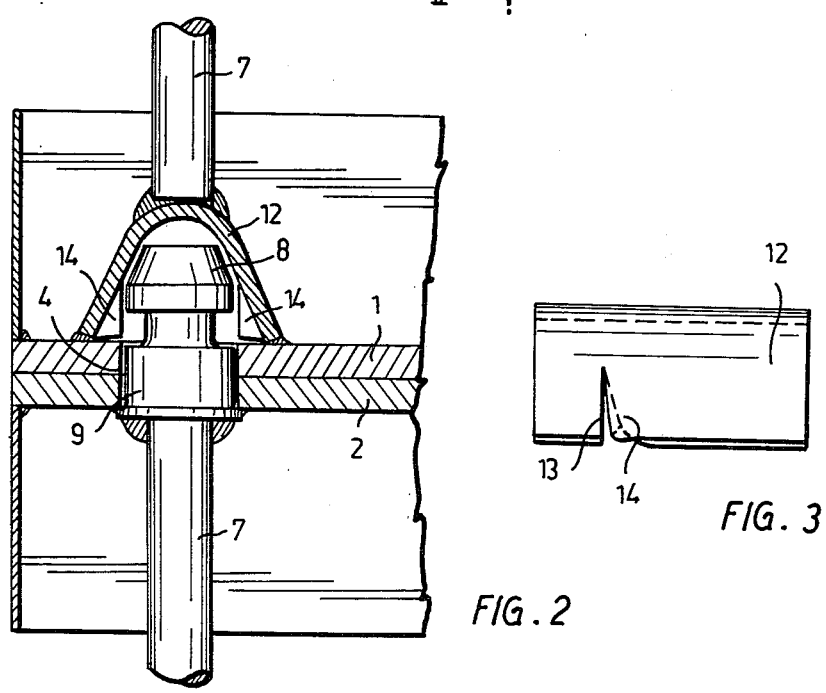
Figure 3:
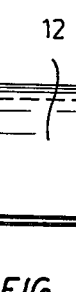

The extension joint for concrete poles in accordance with the invention will be described below in more detail with reference to the attached drawing, wherein FIG. 1 is a top view of the bottom plate, whereby the furrow has been removed from the upper wedge position, FIG. 2 is a section along line II—II in FIG. 1, without plate 3 and FIG. 3 is a side view of a furrow.

The extension joint for concrete poles shown in FIGS. 1 and 2 is provided with a bottom plate which is located in the joint end of the pole and which forms the end face of the pole. The bottom plate of the upper pole is indicated by reference numeral 1 and that of the lower one by reference numeral 2. Moreover, each bottom plate is provided with an opening 4.

To the bottom plate is also secured by welding an anchoring steel 7 of circular cross section, whose extension pin passes through the bottom plate. The length of the pin exceeds the total thickness of the bottom plates. The free end of the pin is provided with a flange 8, whose diameter is slightly smaller than the diameter of the hole 4, so that the flange can be inserted through the hole. The flange 8 is positioned so that, when the bottom plates are placed against each other, the distance between the flange and the stop faces of the bottom plate 1 is slightly smaller than the thickness of the wedge, whereby prestressing between the poles is produced at the driving-in stage. In order that the wedge could, however, be inserted easily into its position, the thickness of the front parts of the shanks is somewhat smaller towards the end. The pin is preferably, at some distance from the flange 8, provided with another flange 9, which has a diameter equal to that of the flange 8. The flange 9 prevents lateral movement of the pole ends before wedging. Likewise, it prevents any bending of the pin owing to the wedging force.

The extension joint additionally includes the wedge 10 (see FIG. 1), which is substantially U-shaped and in which the distance between the shanks 11 corresponds to the diameter of the pin of the anchoring steel.

As comes out especially from FIG. 2, a channel member or furrow 12 has been fastened to the upper face of the bottom plate 1 by welding, which furrow covers the pin of the anchoring steel 7 and the wedge and which furrow is parallel to the wedge. The anchoring steel 7 is fastened to the outer face of the bottom of the furrow.

According to the invention, a transverse cut 13 has been made into the side walls of the furrow 12, said cut extending from the longitudinal edges of the furrow about to the middle of the height of the furrow and being placed behind the pin of the anchoring steel 7 as viewed in the driving-in direction of the wedge. The wall portion 14 in front of the cut has been bent diagonally inwards so as to form an angle of about 25° to 35° with the longitudinal edge of the furrow. The cuts 13 and the bendings of the wall portions are preferably made at the same time as the furrow blank is pressed into the U-shape. The pressing tools are then provided with projections and recesses of corresponding shape. The notches formed on the outer side of the furrow are preferably filled by welding, which seals the sides of the furrow and makes the wall portions 14 more solid. During the concreting of the pole, the ends of the furrow are sealed, e.g., by means of plastic plugs.

An extension joint for concrete poles in accordance with the invention is installed as follows.

After a concrete pole, which is not shown and whose bottom plate is denoted with reference numeral 2, has been driven deep enough into the ground, a second concrete pole is placed onto it, the bottom plate of the latter concrete pole being denoted with reference numeral 1. During this operation the pins of the anchoring steels 7 fastened to the bottom plate 1, together with their flanges, penetrate into the hole 4 in the bottom plate 2 and partly through same. In the corresponding way, the pins of the anchoring steels fastened to the bottom plate 2 penetrates into the hole 4 in the bottom plate 1 and partly through same.

When the bottom plates lie against each other, a wedge 10 is driven from the side between them and the flange 8 so that its shanks 11 become positioned on opposite sides of the anchoring steel 7 pin. When the wedge is being driven in, the side walls of the furrow guide it and, when the outer faces of its shanks meet the wall portions 14 of the furrow 12, the shanks 11 are bent towards each other and lock the wedge in its position, because the distance between the bent shanks is smaller than the diameter of the anchoring steel. The wedge has reached its end position when its impact face is in the same plane with the outer end of the stop face, at which time the recesses 15 at the sides of the wedge also coincide with the edges of the wall portions 14 and thereby ensure the locking.

Differing from what is described above, a locking plate 3 can be fastened around the opening 4 on the inner side of the bottom plate as shown in FIG. 1, which locking plate is an object substantially of the shape of parallel piped in whose middle there is a through hole of circular cross section and of a diameter equal to the diameter of the above hole 4 in the bottom plate and placed above this opening. The stop face of the bottom plate is in this case placed in the locking plate.

What I claim is:

1. An extension joint for concrete poles in which the joint ends of the poles are provided with a bottom plate to which are fastened jointing means comprising a pin projecting from the bottom plate of a first pole, an opening in the bottom plate of a second pole, and a stop face which is located around the opening on the inside of the bottom plate and through which said pin can extend, and a wedge which is transverse to the pin and provided with shanks each engaging the pin on one side and which can be wedged in between a shoulder at the end of the pin and the stop face for locking the pin of the first pole to the second pole with prestressing, whereby, on the path of movement of the wedge shanks, when they are being driven into their positions, there are guide means fastened to the stop face, by the effect of which guide means the shanks are turned towards each other having passed by the pin, thereby locking the wedge in the locking position, and, moveover, the wedge and the free end of the pin are covered by a channel member parallel to the wedge, the longitudinal edges of the channel being fastened to the stop face, the guide means for the wedge shanks consisting of wall portions of the channel bent diagonally inwards at transverse cuts in the side walls of the channel.

2. An extension joint as claimed in claim 1, wherein the wall portion located in front of the cuts, as viewed in the driving-in direction of the wedge, is bent inwards.

3. An extension joint as claimed in claim 1, wherein the outside notch formed by the bent wall portion is filled with welding material.

4. An extension joint as claimed in claim 1, wherein the bending angle of the wall portion is approximately 25° to 35°.

* * * * *